United States Patent
Kremer et al.

(10) Patent No.: US 9,749,867 B2
(45) Date of Patent: *Aug. 29, 2017

(54) AUTHORIZED AREAS OF AUTHENTICATION

(71) Applicant: Finjan Mobile, Inc., East Palo Alto, CA (US)

(72) Inventors: Alexander Lin Kremer, San Mateo, CA (US); Geoffrey House, San Francisco, CA (US); Lee McDole, Oakland, CA (US); Michael Godlewski, San Francisco, CA (US); Rudolph Mutter, Millbrae, CA (US); Timothy Shipman, San Francisco, CA (US); Jules Panopoulos, Mountain View, CA (US)

(73) Assignee: Finjan Mobile, Inc., East Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/371,396

(22) Filed: Dec. 7, 2016

(65) Prior Publication Data

US 2017/0142590 A1 May 18, 2017

Related U.S. Application Data

(63) Continuation of application No. 15/084,969, filed on Mar. 30, 2016, now Pat. No. 9,554,279.
(Continued)

(51) Int. Cl.
*H04L 29/06* (2006.01)
*H04W 12/08* (2009.01)
(Continued)

(52) U.S. Cl.
CPC .......... *H04W 12/08* (2013.01); *H04L 63/083* (2013.01); *H04L 63/0861* (2013.01);
(Continued)

(58) Field of Classification Search
CPC ... H04L 63/107; H04L 63/108; H04L 63/083; H04L 63/0861; H04W 12/08; H04W 4/021; H04W 12/06
See application file for complete search history.

(56) References Cited

U.S. PATENT DOCUMENTS 8,090,351 B2 1/2012 Klein
8,295,898 B2 10/2012 Ashfield et al.
(Continued)

OTHER PUBLICATIONS

PCT/US16/38592, International Search Report and Written Opinion, Aug. 5, 2016, 10 pages.
(Continued)

*Primary Examiner* — Michael Pyzocha
(74) *Attorney, Agent, or Firm* — Soquel Group I.P Ltd

(57) ABSTRACT

An electronic device including a memory storing biometric or passcode data of a user, and a processor, scanning biometric or passcode data of the user and validating the scanned biometric or passcode data with the stored biometric or passcode data, dynamically identifying a current location of the electronic device, accessing a secure network, requesting access of data over the secure network, wherein access to the data is controlled by a server and the server enables access to the secure data only when the current location of the electronic device is within an authorized area of authentication (AAA), and if the current location of the mobile device is not within an existing AAA, the biometric or passcode data of the user is validated and contingent upon the validation being affirmative, submitting a request to the server to generate a temporary AAA that includes the current location of the electronic device.

12 Claims, 13 Drawing Sheets

Related U.S. Application Data

(60) Provisional application No. 62/254,229, filed on Nov. 12, 2015.

(51) Int. Cl.
    *H04W 12/06*      (2009.01)
    *H04W 4/02*      (2009.01)

(52) U.S. Cl.
    CPC .......... *H04L 63/107* (2013.01); *H04L 63/108* (2013.01); *H04W 4/021* (2013.01); *H04W 12/06* (2013.01)

(56) References Cited

U.S. PATENT DOCUMENTS

| | | | |
|---|---|---|---|
| 8,700,003 | B2 | 4/2014 | Klein |
| 9,253,198 | B2 | 2/2016 | Hughes, Jr. et al. |
| 2007/0186007 | A1 | 8/2007 | Field et al. |
| 2007/0223424 | A1 | 9/2007 | Su et al. |
| 2009/0235346 | A1 | 9/2009 | Steinberg |
| 2010/0024017 | A1 | 1/2010 | Ashfield |
| 2010/0211997 | A1 | 8/2010 | McGeehan et al. |
| 2011/0028094 | A1 | 2/2011 | Masuda |
| 2011/0092185 | A1 | 4/2011 | Garskof |
| 2013/0275303 | A1 | 10/2013 | Fiore et al. |
| 2014/0053250 | A1 | 2/2014 | Wethington et al. |
| 2014/0214670 | A1 | 7/2014 | McKenna |
| 2015/0032621 | A1 | 1/2015 | Kar et al. |
| 2015/0121464 | A1 | 4/2015 | Hughes, Jr. et al. |
| 2015/0264573 | A1 | 9/2015 | Giordano et al. |
| 2015/0381610 | A1 | 12/2015 | Poornachandran et al. |
| 2016/0073261 | A1 | 3/2016 | Hughes, Jr. et al. |
| 2016/0174072 | A1 | 6/2016 | Allyn |
| 2016/0344736 | A1* | 11/2016 | Khait .................. H04L 63/0807 |

OTHER PUBLICATIONS

"Multi-Factor Authentication Solutions—Authentify", Oct. 2015. http://authentify.com.

"Population Health Management & Healthcare Analytics | Caradigm", Oct. 2015. https://www.caradigm.com.

"Two-Factor Authentication and Endpoint Security: Duo Security", Oct. 2015. https://duo.com.

"Information Security, Digital Security, Data Security—Entrust", Oct. 2015. https://www.entrust.com.

"Google 2-Step Verification", Oct. 2015. http://www.google.com/landing/2step.

"Hitachi ID Password Manager", Oct. 2015. http://hitachi-id.com/password-manager.

"Healthcare IT & Communications Solutions | Imprivata", Oct. 2015. https://www.imprivata.com.

"LastPass | Password Manager, Auto Form Filler, Random Password Generator", Oct. 2015. https://lastpass.com.

"RSA | Security Solutions to Address Cyber Threats", Oct. 2015. https://www.rsa.com.

"Cloud Based Two Factor Authentication | SAASPASS", Oct. 2015. https://www.saaspass.com.

"Two Factor Authentication | SecureAuth", Oct. 2015. https://www.secureauth.com.

"GRC's | SQRL Secure Quick Reliable Login", Oct. 2015. https://www.grc.com/sqrl/sqrl.htm.

"XYverify Mobile Transaction and Authentication Solutions", 2015. http://www.xyverify.com/.

\* cited by examiner

| Username ⌄ | Most Recent Login Attempt |
|---|---|
| User1 | Unauthorized Login - on Tuesday, August 25, 2015 at 12:15 AM |
| User2 | Authorized Login - on Friday, September 4, 2015 at 6:36 PM |
| User3 | (None) |
| User4 | Unauthorized Login - 2121-2359 First Street, City, State Zip, USA on Thursday, September 10, 2015 |
| User5 | (None) |
| User6 | (None) |
| User7 | Unauthorized Login - 2345 Second Street, City, State Zip, USA on Thursday, December 17, 2015 |
| User8 | Authorized Login - Temporary AAA on Thursday, December 17, 2015 at 9:18 PM |
| User9 | Authorized Login - London Marriott on Friday, September 4, 2015 at 10:02 PM |

FIG. 11

| | | | | |
|---|---|---|---|---|
| ⊙ | Sept. 14, 2015, 3:18 PM (PDT) | User1 | 37.77512 | -122.4113 | 410 Charles Way, City, State 12345, USA |
| ⊙ | Sept. 14, 2015, 10:39 PM (PDT) | User1 | 37.77512 | -122.4113 | 410 Charles Way, City, State 12345, USA |
| ⊙ | Sept. 14, 2015, 3:07 PM (PDT) | User1 | 37.77512 | -122.4113 | Temporary AAA - 410 Charles Way, City, State 12345, USA |
| ⊙ | Sept. 14, 2015, 12:52 PM (PDT) | User1 | 37.77512 | -122.4113 | 410 Charles Way, City, State 12345, USA |
| ⊙ | Sept. 14, 2015, 12:36 PM (PDT) | User1 | 37.77512 | -122.4113 | 410 Charles Way, City, State 12345, USA |
| ⊙ | Sept. 14, 2015, 10:11 PM (PDT) | User1 | 37.77512 | -122.4113 | Temporary AAA - 410 Charles Way, City, State 12345, USA |
| ⊙ | Sept. 14, 2015, 9:41 PM (PDT) | User1 | 37.77512 | -122.4113 | Temporary AAA - 410 Charles Way, City, State 12345, USA |
| ⊙ | Sept. 14, 2015, 9:40 PM (PDT) | User1 | 37.77512 | -122.4113 | Temporary AAA - 410 Charles Way, City, State 12345, USA |
| ⊙ | Sept. 14, 2015, 9:39 PM (PDT) | User1 | 37.77512 | -122.4113 | Temporary AAA - 410 Charles Way, City, State 12345, USA |

FIG. 13

AUTHORIZED AREAS OF AUTHENTICATION

PRIORITY REFERENCE TO PROVISIONAL APPLICATIONS

This application is a continuation of and hereby incorporates by reference U.S. patent application Ser. No. 15/084,969, entitled AUTHORIZED AREAS OF AUTHENTICATION, and filed on Mar. 30, 2016 by inventors Alexander Lin Kremer, Geoffrey House, Lee McDole, Michael Godlewski, Rudolph Mutter, Timothy Shipman and Jules Panopoulos. U.S. patent application Ser. No. 15/084,969 claims benefit of and hereby incorporates by reference U.S. Provisional Application No. 62/254,229, entitled METHOD AND SYSTEM USING GEO-LOCATION DATA AND INFORMATION FOR ADDED LAYER OF SECURITY, and filed on Nov. 12, 2015 by inventors Alex Lin, Geoff House, Lee McDole, Michael Godlewski, Rudolph Mutter, Timothy Shipman and Jules Panopoulos.

FIELD OF THE INVENTION

The present invention relates to computer data security.

BACKGROUND OF THE INVENTION

Enterprises store sensitive and private company and customer data on secure file servers. As users become more mobile, it is becoming common for users to remotely access files on these file servers via their mobile computing devices. Typically, a user can login to an enterprise file server using a basic user ID and password, over a secure network such as a virtual private network. This is a relatively weak form of security, and data breaches often occur where sensitive data is accessed and used by unauthorized people.

As such, it would be of great advantage to provide an additional layer of security for remote access to file servers via mobile devices.

SUMMARY

Embodiments of the present invention provide modules, systems and methods for an additional layer of security for remote access to file servers via mobile devices of authorized users. Access to a file server is granted only if a mobile device is verified to be located within an authorized area of authentication (AAA). If the mobile device is not within the AAA, a temporary AAA, including the current location of the mobile device, may be authorized.

There is thus provided in accordance with an embodiment of the present invention a system for secure access, including a stationary computing device that controls access to secure data over a secure network, including an AAA generator, generating an AAA for administering the secure data, an AAA validator, validating a mobile computing device that submits an access request for the secure data via a connection over the secure network, by verifying that a current location of the mobile device is within the AAA, and an access controller, enabling the mobile device to access the secure data, only in response to the validator affirmatively validating the mobile device, and a mobile computing device in communication with the stationary device, including a location identifier, dynamically identifying a current location of the mobile device, a connection controller for logging in to and out of the secure network, and an access requestor, submitting to the access controller via the secure network (i) an access request for the secure data, and (ii) the current location of the mobile device.

There is additionally provided in accordance with an embodiment of the present invention a secure access server computer, including an authorized area of authentication (AAA) generator, generating an AAA for administering secure data, access to which is controlled by the server over a secure network, an AAA validator, validating a mobile device that submits an access request for the secure data via a connection over the secure network, by verifying that a current location of the mobile device is within the AAA; and an access controller, enabling the mobile device to access the secure data over the secure network only in response to the AAA validator affirmatively validating the mobile device.

There is further provided in accordance with an embodiment of the present invention a mobile device for accessing secure data, including a location identifier, dynamically identifying a current location of the mobile device, a connection controller logging in to and out of a secure network, and an access requestor, submitting to a server computer via a connection over the secure network, both (i) an access request for secure data, access to which is controlled by the server, and (ii) the current location of the mobile device, wherein the server enables access to the secure data only when the current location of the mobile device is within an authorized area of authentication.

There is yet further provided in accordance with an embodiment of the present invention a method for secure access, including generating, by a stationary computing device, an authorized area of authentication (AAA) for administering secure data, access to which is controlled by the stationary device over a secure network, submitting, by a mobile computing device to the stationary device via a connection over a secure network, a request to access the secure data, further submitting, by the mobile device to the stationary device, a current location of the mobile device, validating, by the stationary device, the mobile device, including verifying that the current location of the mobile device is within the AAA, and granting the mobile device access to the secure data, only in response to the validating being affirmative.

There is moreover provided in accordance with an embodiment of the present invention a method for a secure access server, including generating an authorized area of authentication (AAA), for administering secure data, access to which is controlled by a server computer over a secure network, receiving, from a mobile computing device via a connection over the secure network, a request to access the secure data, further receiving, from the mobile device over the secure network, a current location of the mobile device, validating the mobile device, comprising verifying that the current location of the mobile device is within the AAA, and enabling the mobile device to access to the secure data, only in response to the validating being affirmative.

There is additionally provided in accordance with an embodiment of the present invention a method for secure access by a mobile computer device, including identifying a current location of a mobile computing device, submitting, to a server computer via a connection over a secure network, a request to access secure data, access to which is controlled by the server, further submitting to the server over the secure network, the current location, and only when the current location is within an authorized area of authentication (AAA) for the server, receiving, from the server, an enablement to access the secure data.

BRIEF DESCRIPTION OF THE DRAWINGS

The present invention will be more fully understood and appreciated from the following detailed description, taken in conjunction with the drawings in which:

FIG. 11 is a screen shot showing an exemplary log report for an administrator, generated by an access log recorder, in accordance with an embodiment of the present invention;

FIG. 13 is a screen shot showing an exemplary log report generated for an administrator, by an access log recorder, in accordance with an embodiment of the present invention.

For reference to the figures, the following index of elements and their numerals is provided. Similarly numbered elements represent elements of the same type, but they need not be identical elements.

| Table of elements in the figures | |
|---|---|
| Element | Description |
| 100 | stationary computing device |
| 110 | processor |
| 120 | AAA generator |
| 130 | AAA validator |
| 140 | AAA access controller |
| 150 | organization file server |
| 160 | organization administrator computer |
| 170 | access log recorder |
| 200 | mobile computing device |
| 210 | processor |
| 220 | location identifier |

-continued

| Table of elements in the figures | |
|---|---|
| Element | Description |
| 230 | connection controller |
| 240 | access requestor |
| 250 | biometric/passcode scanner |
| 260 | biometric/passcode validator |

Elements numbered in the 1000's are operations of flow charts.

DETAILED DESCRIPTION

In accordance with embodiments of the present invention, modules, systems and methods are provided for an additional layer of security for remote access to file servers via mobile devices. These modules, systems and methods are implemented using computing systems including inter alia servers, clients, network devices, and combinations of such devices.

Figure 1:
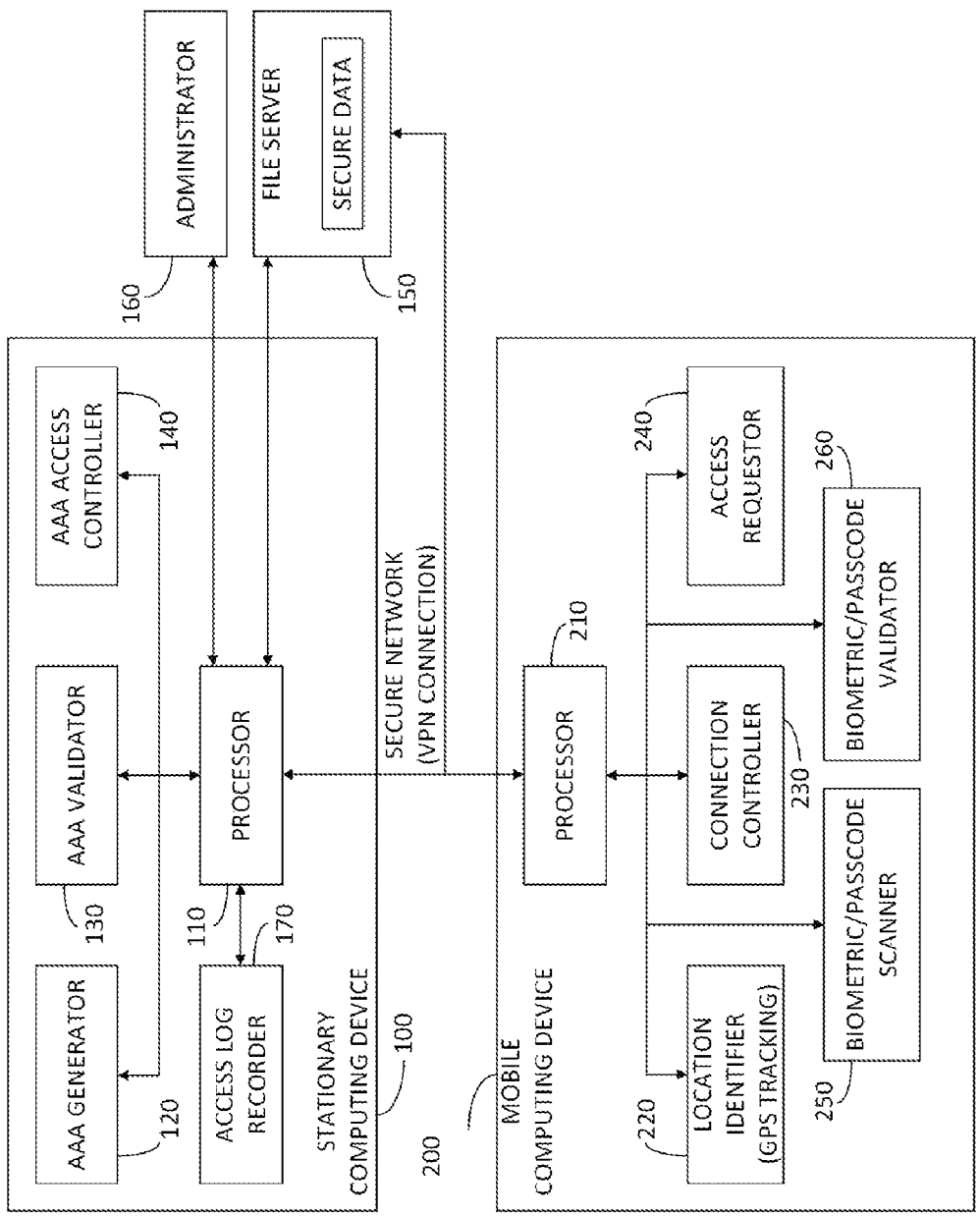
FIG. 1 is a simplified block diagram of a system for secure access, in accordance with an embodiment of the present invention.

Reference is made to FIG. 1, which is a simplified block diagram of a system for secure access, in accordance with an embodiment of the present invention. FIG. 1 shows a stationary computing device 100 and a mobile computing device 200. Stationary device 100 controls access to an organization's file server 150 that stores secure data. More generally, file server 150 represents any type of server that allows one or more users of mobile devices to access content of the organization.

Access to file server 150 via stationary device 100 is managed by an administrator computer 160. File server 150 is remotely accessible over a secure network, such as a virtual private network (VPN). An access log recorder 170 logs each access to file server 150 and each attempt to access file server 150, and report the logs to administrator 160.

Stationary device 100 may be inter alia a server, a network device, and a combination of such devices. Administrator 160 may be a desktop computer, a laptop computer, a network device, or such other computing device. Administrator 160 manages user accounts and their associated remote devices. In accordance with an embodiment of the present invention, each user and account must be authorized by stationary device 100 before a user may access files on file server 150.

Stationary device 100 includes a processor 110, an authorized area of authentication (AAA) generator 120, an AAA validator 130, and an AAA access controller 140. An "authorized area of authentication" is one or more geographic areas that provide an additional layer of security to supplement conventional user authentication credentials such as username and password. In order to access file server 150, a user must be authenticated by his current location, in additional to conventional authentication. If the user is not located in an AAA, then his access to file server 150 is denied. The user may request a temporary authentication, as explained in detail below, but otherwise he is not granted access.

In alternative embodiments of the present invention, one or more of AAA generator 120, AAA validator 130, and AAA access controller 140 reside in administrator 160 instead of stationary device 100.

Use of AAA is of particular advantage when an organization has mobile users, with mobile computing devices 200 that include a processor 210 and a location identifier 220, such as inter alia a GPS tracker or an agent that provides location data, that dynamically determines a device's current geographic location. By transmitting an identifier of the location to stationary device 100, AAA validator 130 is able to determine whether or not a user of mobile device 200 is located in an AAA. Mobile device 200 also includes a connection controller 230, for connection to stationary device 100 and to file server 150 over a secure network, and an access requestor 240 for requesting temporary authentication. Regarding the secure network, mobile device 200 may be inter alia on a VPN connection with stationary device 100 and file server 150. Stationary device 100 and file server 150 may be on that same secure network as well.

Mobile device 200 also includes a biometric/passcode scanner 250, which scans a biometric, such as a fingerprint or an iris, or scans a passcode, such as a PIN, of a user who is currently using mobile device 200; and a biometric/passcode validator 260, which validates the user's biometric/passcode that was scanned by scanner 250.

Operation of the various components of stationary device 100 and mobile device 200 is described below with regards to FIGS. 2-13.

Mobile device 200 may be inter alia a smartphone, a tablet computer, a laptop computer and such other remote access device. Stationary device 100, file server 150, administrator 160 and mobile device 200 are not limited to any particular operating system. Administrator 160 and mobile device 200 may each be implemented inter alia using an application program interface (API) that communicates with stationary device 100.

Figure 2:
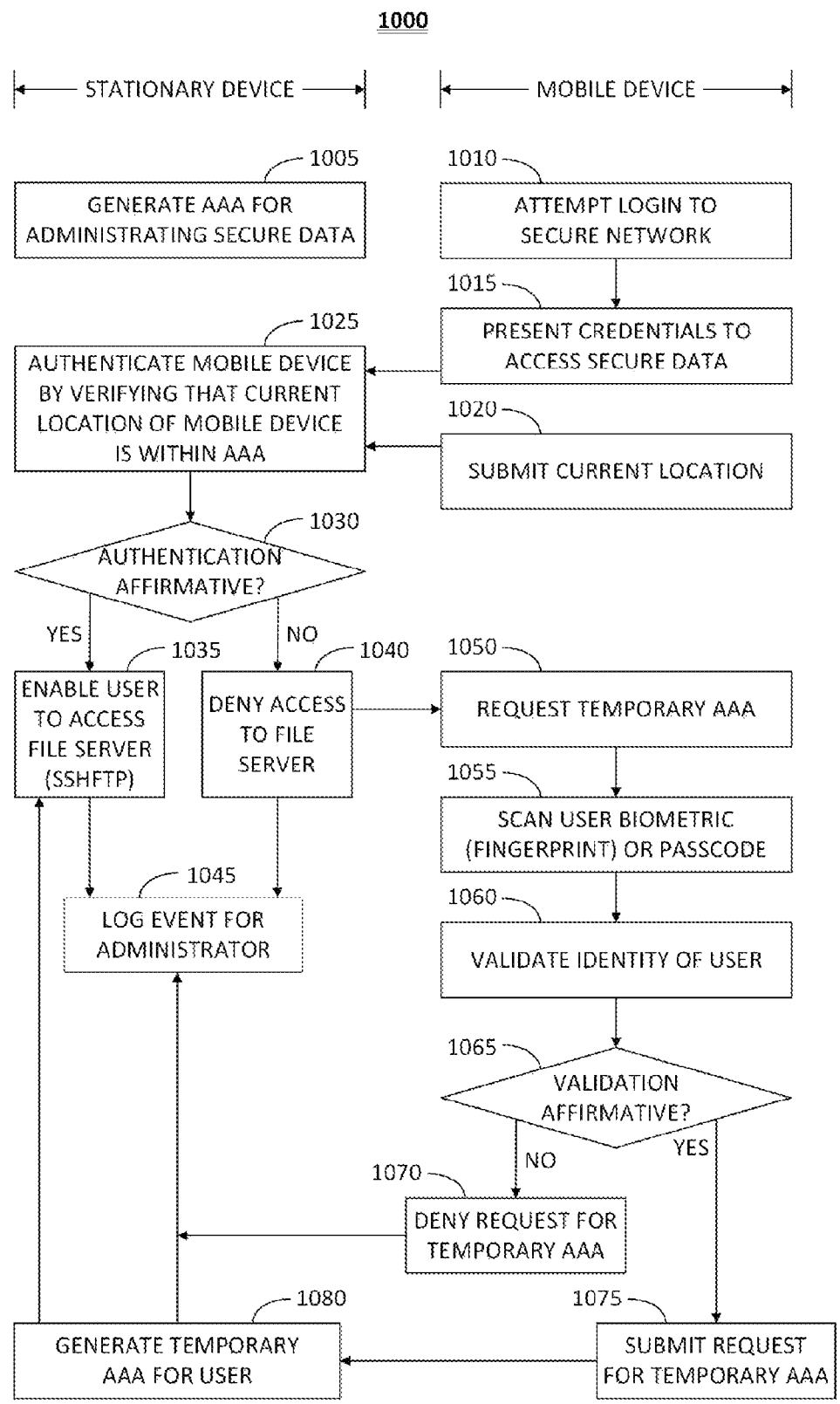
FIG. 2 is a simplified flowchart of a method for secure access, in accordance with an embodiment of the present invention.

Reference is made to FIG. 2, which is a simplified flowchart of a method 1000 for secure access, in accordance with an embodiment of the present invention. The flowchart of FIG. 2 is divided into two columns. The left column includes operations performed by stationary device 100, and the right column includes operations performed by mobile device 200. At operation 1005 AAA generator 120 generates an AAA for accessing an organization's secure data stored on file server 150. The AAA is set by an organization administrator 160, and includes one or more geographical areas. E.g., the AAA may include various office locations of the organization, and various home locations of employees who work for the organization from their homes. Individual AAAs may be set up by AAA generator 120 for different users on a per-user basis, for different groups of users on a per-group basis, or for an entire enterprise. In an alternative embodiment of the present invention, AAA 120, which performs operation 1005, is a component of administrator 160 instead of stationary device 100.

Figure 3:
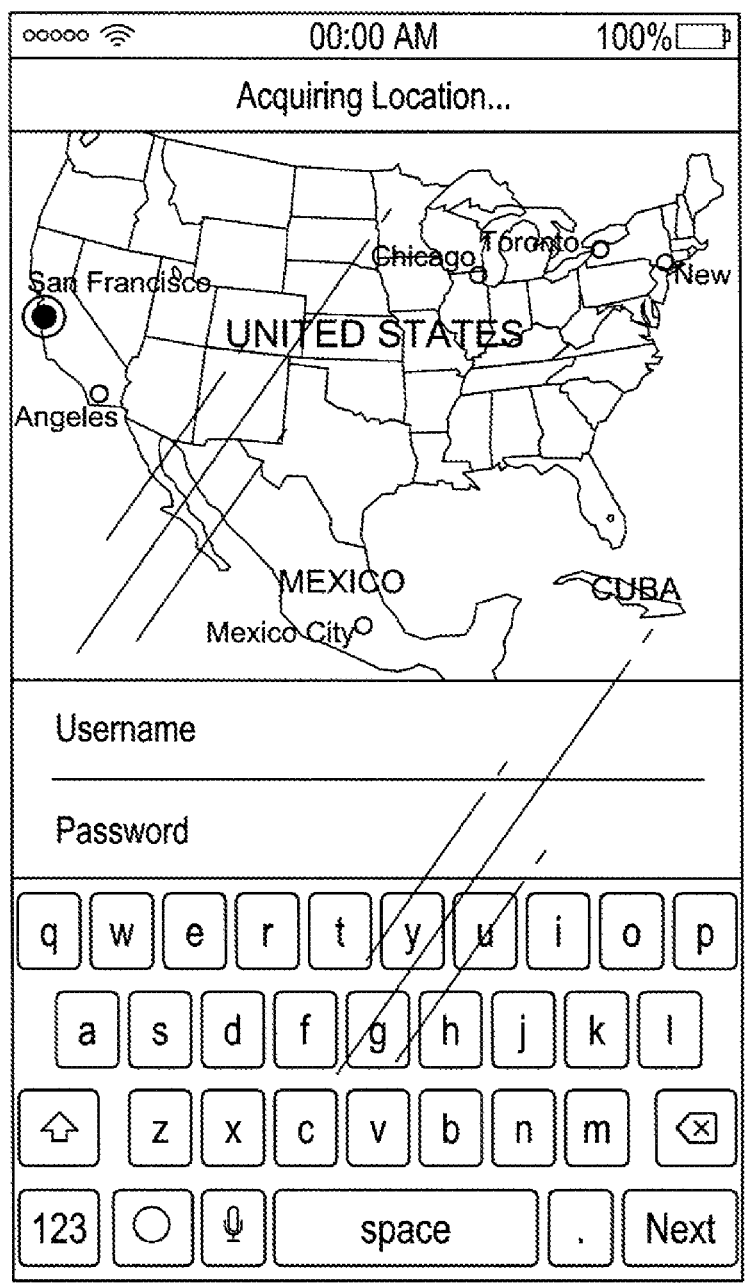
FIG. 3 is a screen shot of a mobile device prompting a user for his username and password for logging in to a secure network, and acquiring the user's current location, in accordance with an embodiment of the present invention.
Figure 4:
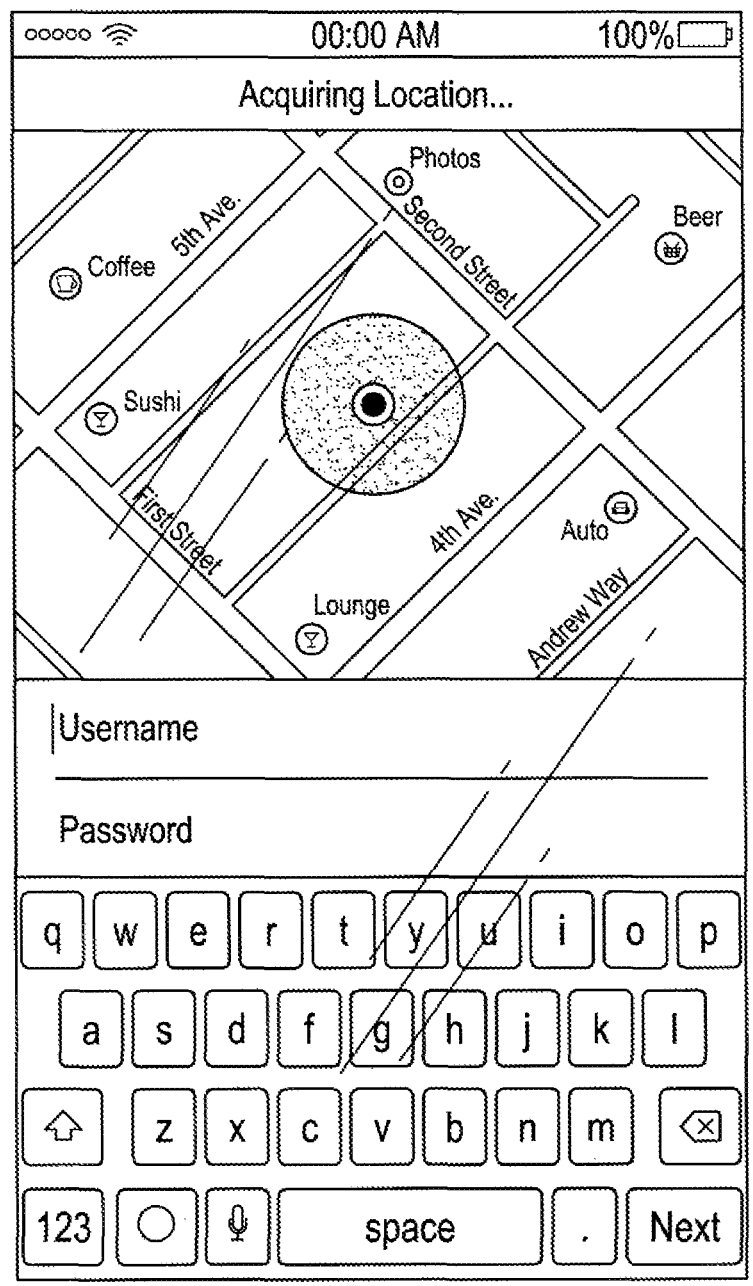
FIG. 4 is a screen shot showing the user's current location on a map, in accordance with an embodiment of the present invention.
Figure 5:
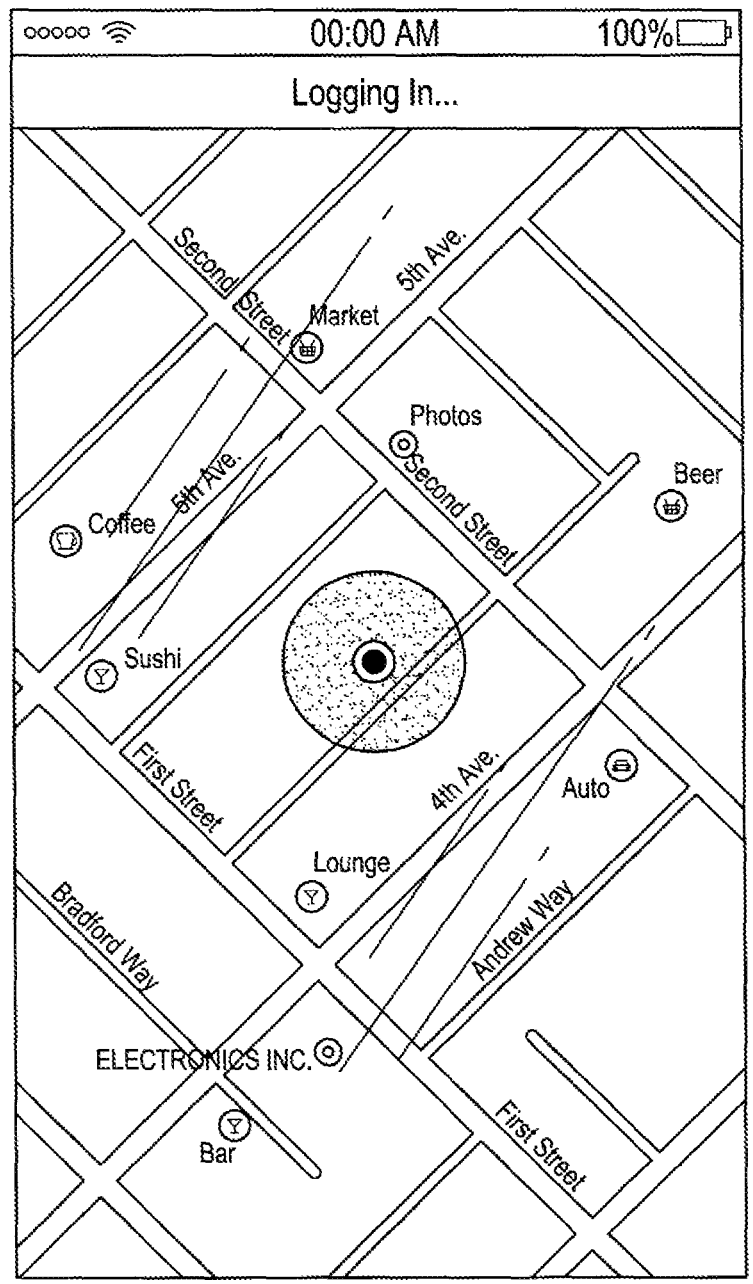
FIG. 5 is a screen shot showing the mobile device logging in to the secure network with the username and password, and with the user's current location, in accordance with an embodiment of the present invention.

At operation 1010 connection controller 230 attempts to log in to a secure network of the organization, such as a virtual private network (VPN), to access file server 150. At operation 1015 the user presents his credentials, such as username and password, for authentication. At operation 1020 the user's current location is identified by location identifier 220, and submitted to AAA validator 130. Reference is made to FIG. 3, which is a screen shot of mobile device 200 prompting a user for his username and password for logging in to the secure network, and acquiring the user's current location, in accordance with an embodiment of the present invention. Reference is made to FIG. 4, which is a screen shot showing the user's current location on a map, in accordance with an embodiment of the present invention. FIG. 4 shows the user being located within a circular area between First and Second Street and between $4^{th}$ and $5^{th}$ Avenue. Reference is made to FIG. 5, which is a screen shot showing mobile device 200 logging in to the secure network with the username and password, and with the user's current location, in accordance with an embodiment of the present invention.

At operation 1025, AAA validator 130 authenticates mobile device 200 by checking credentials such as username and password. AAA validator 130 also verifies that the location submitted at operation 1020 is within an AAA that was generated at operation 1005. At decision 1030, AAA validator 130 decides whether or not the authentication at operation 1025 is verified. If so, then at operation 1035 mobile device 200 is granted access to file server 150, and mobile device 200 is then enabled to access file server 150 such as via SSH FTP. Otherwise, if authentication is not verified at decision 1030, then at operation 1040 mobile device 200 is denied access to file server 150. In either case, the grant of or denial of access is logged by access log recorder 170 at operation 1045, for reporting to administrator 160.

Figure 6:
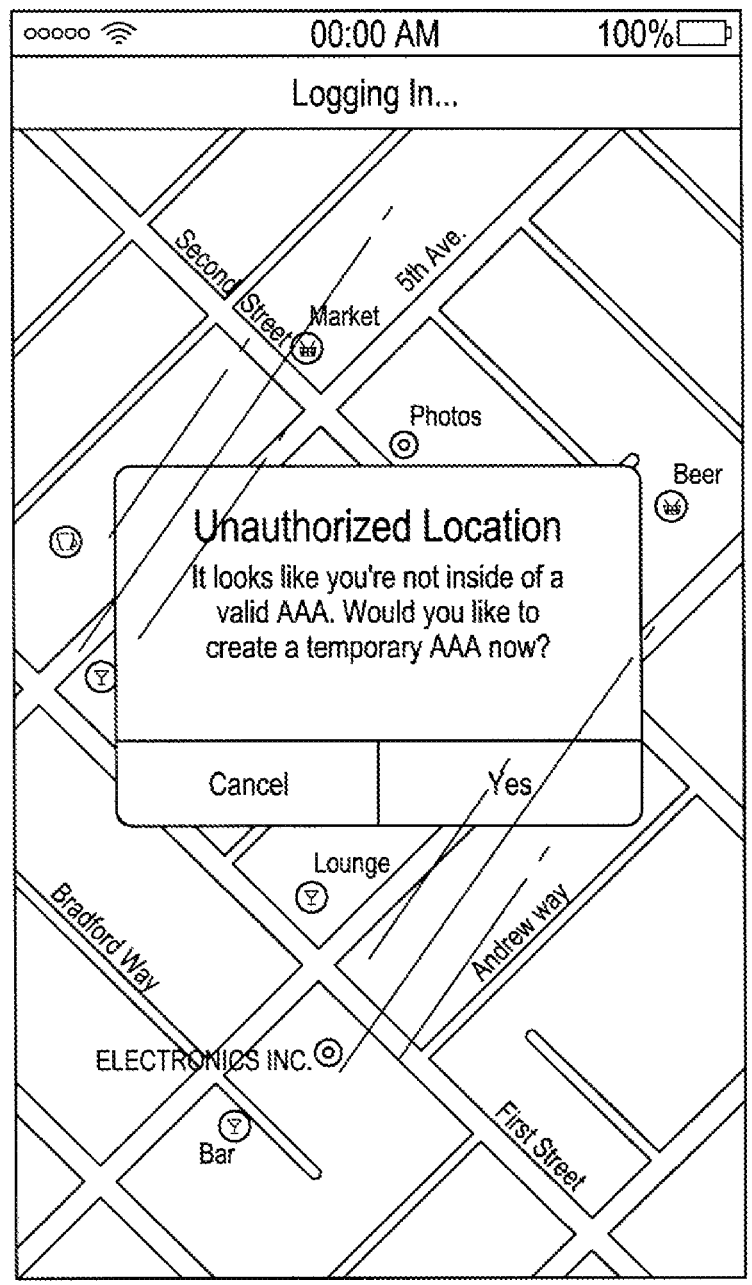
FIG. 6 is a screen shot showing the mobile device informing that user that he is located in an unauthorized area, and prompting the user to request a temporary authorized area of authentication (AAA), in accordance with an embodiment of the present invention.
Figure 7:
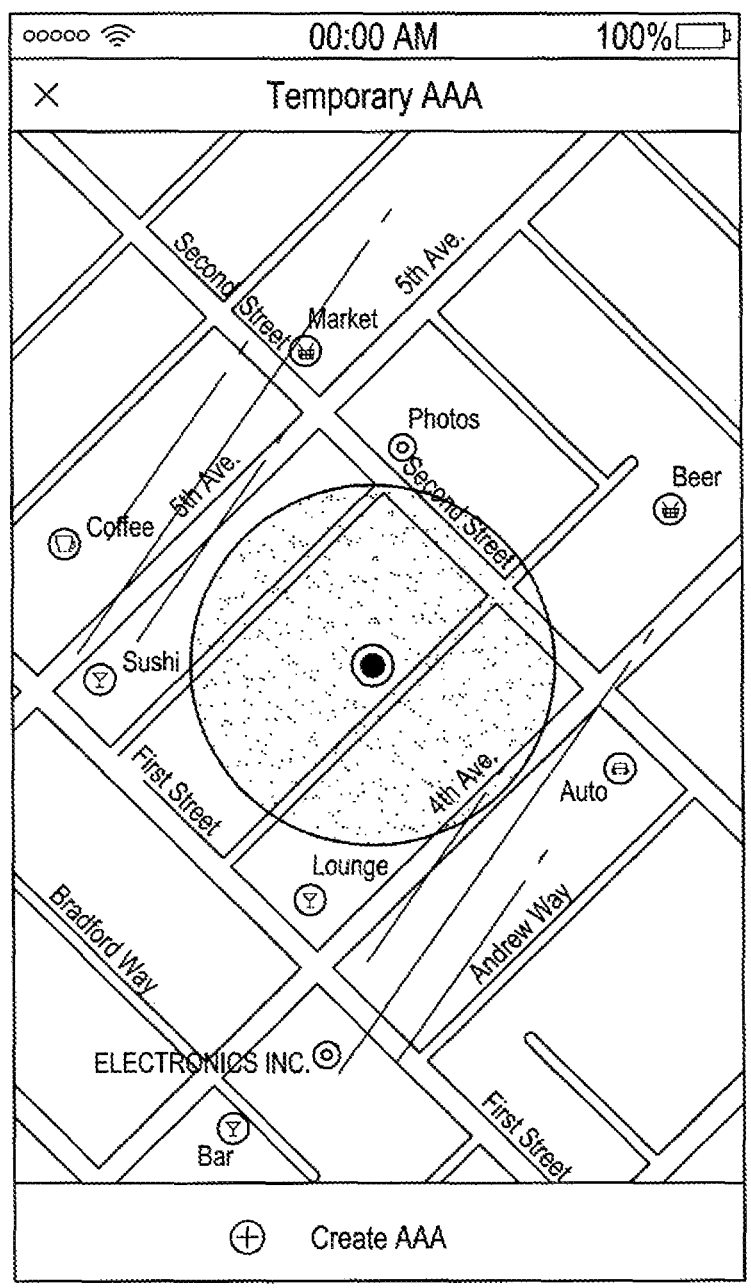
FIG. 7 is a screenshot showing an area centered about the user's current location, in accordance with an embodiment of the present invention.

When access to file server 150 is denied at operation 1040 because mobile device 200 is not within an AAA, then at operation 1050 the user of mobile device 200 requests AAA access controller 140 to instantiate a temporary AAA that includes the current location of mobile device 200, so that the user can temporarily access file server 150. Reference is made to FIG. 6, which is a screen shot showing mobile device 200 informing the user that he is located in an unauthorized area, and prompting the user to request a temporary AAA, in accordance with an embodiment of the present invention. Reference is made to FIG. 7, which is a screenshot showing an area centered about the user's current location, in accordance with an embodiment of the present invention.

Figure 8:
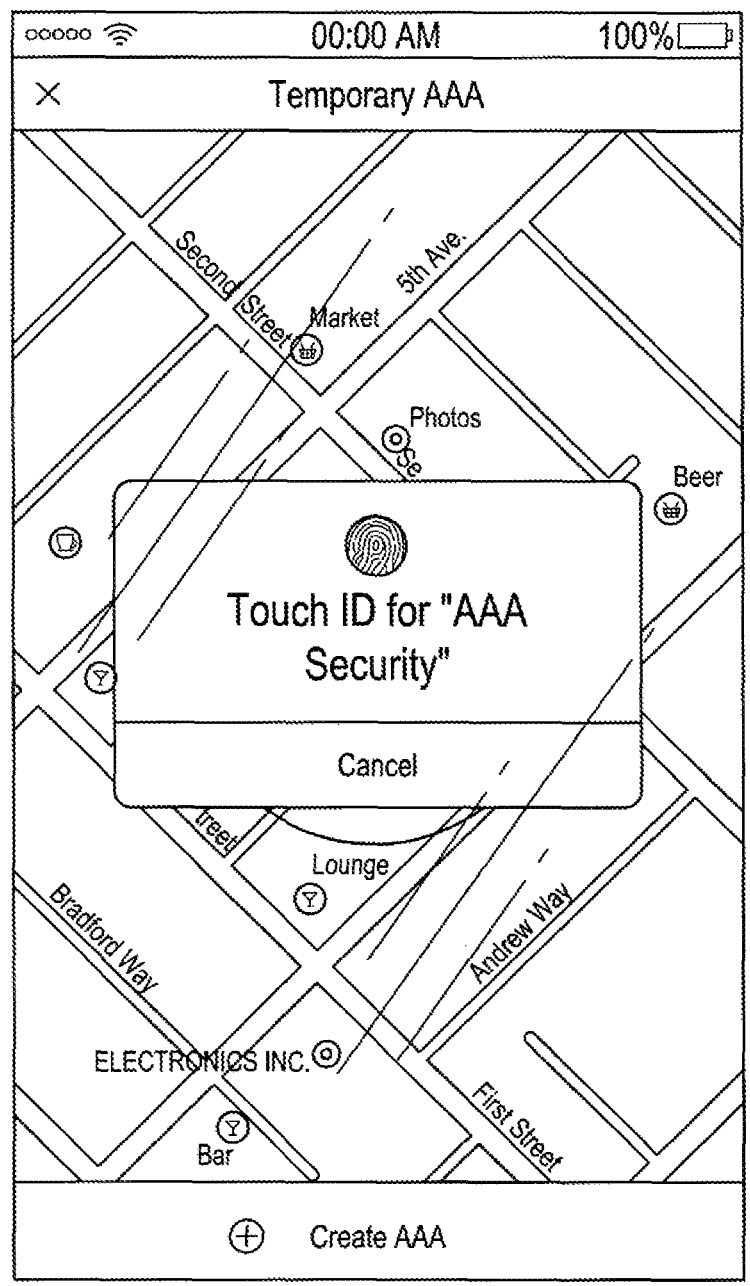
FIG. 8 is a screen shot showing fingerprint identification prior to setting a temporary AAA, in accordance with an embodiment of the present invention.

At operation 1055, biometric/passcode scanner 250 scans a biometric, such as inter alia a fingerprint or iris, of a user who is currently using mobile device 200, or a passcode, such as inter alia a PIN code, for the user. At operation 1060, biometric/passcode validator 260 validates the identity of the user, based on the user's scanned biometric/passcode, to ensure that the user who is currently using mobile device 200 is indeed authorized to use mobile device 200 and request a temporary AAA. Reference is made to FIG. 8, which is a screen shot showing fingerprint identification prior to setting a temporary AAA, in accordance with an embodiment of the present invention.

Figure 9:
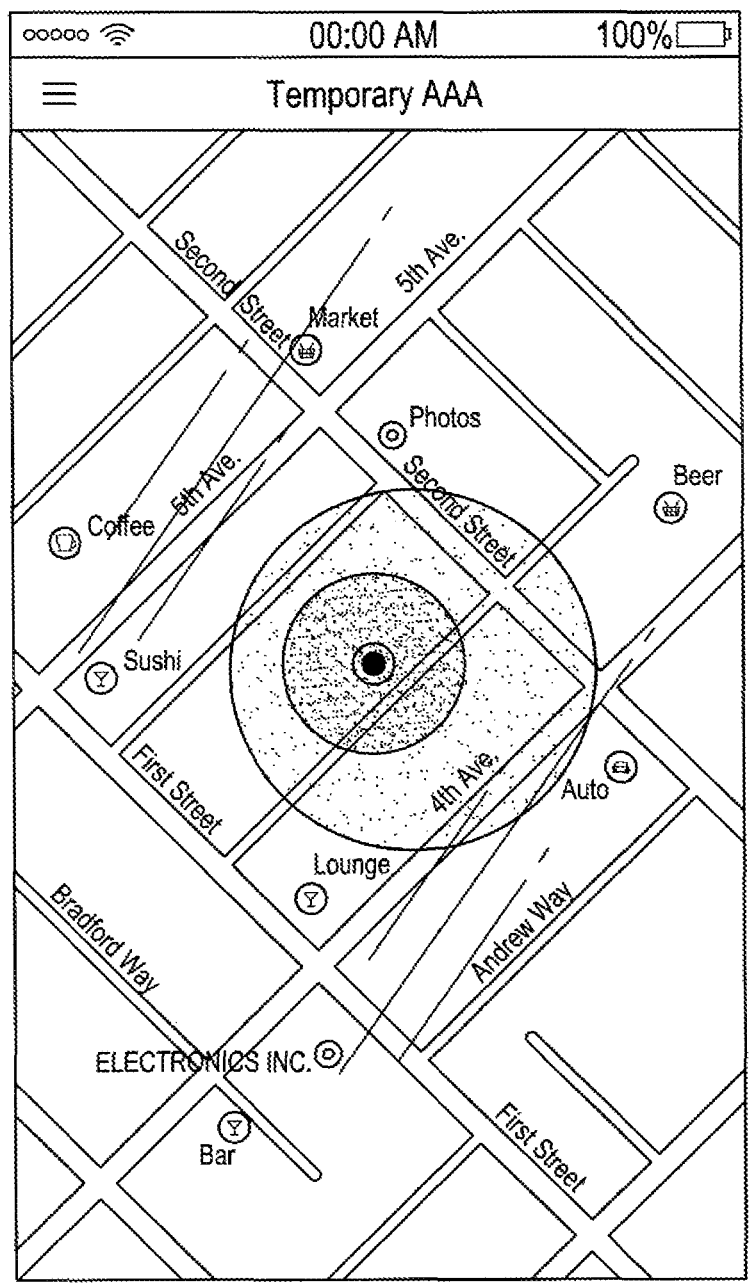
FIG. 9 is a screen shot showing that a temporary AAA has been set for the user, in accordance with an embodiment of the present invention.

At decision 1065, mobile device 200 decides whether or not the validation at operation 1060 is affirmative. If not, then at operation 1070 the request for the temporary AAA is denied, and the user is denied access to file server 150. Denial of access is then logged by access log recorder 170 at operation 1045, for reporting to administrator 160. Otherwise, if decision 1065 decides that the validation is affirmative, then at operation 1075 the request for the temporary AAA is submitted to stationary device 200, and at operation 1080 AAA access controller 140 sets a temporary AAA for the user, at his current location. Reference is made to FIG. 9, which is a screen shot showing that a temporary AAA has been set for the user, in accordance with an embodiment of the present invention. At operation 1035 mobile device 200 is granted access to file server 150, and mobile device 200 is then enabled to access file server 150 such as via SSH FTP. Access to file server 150 via the temporary AAA is logged by access log recorder 170 at operation 1045, for reporting to administrator 160.

Figure 10:
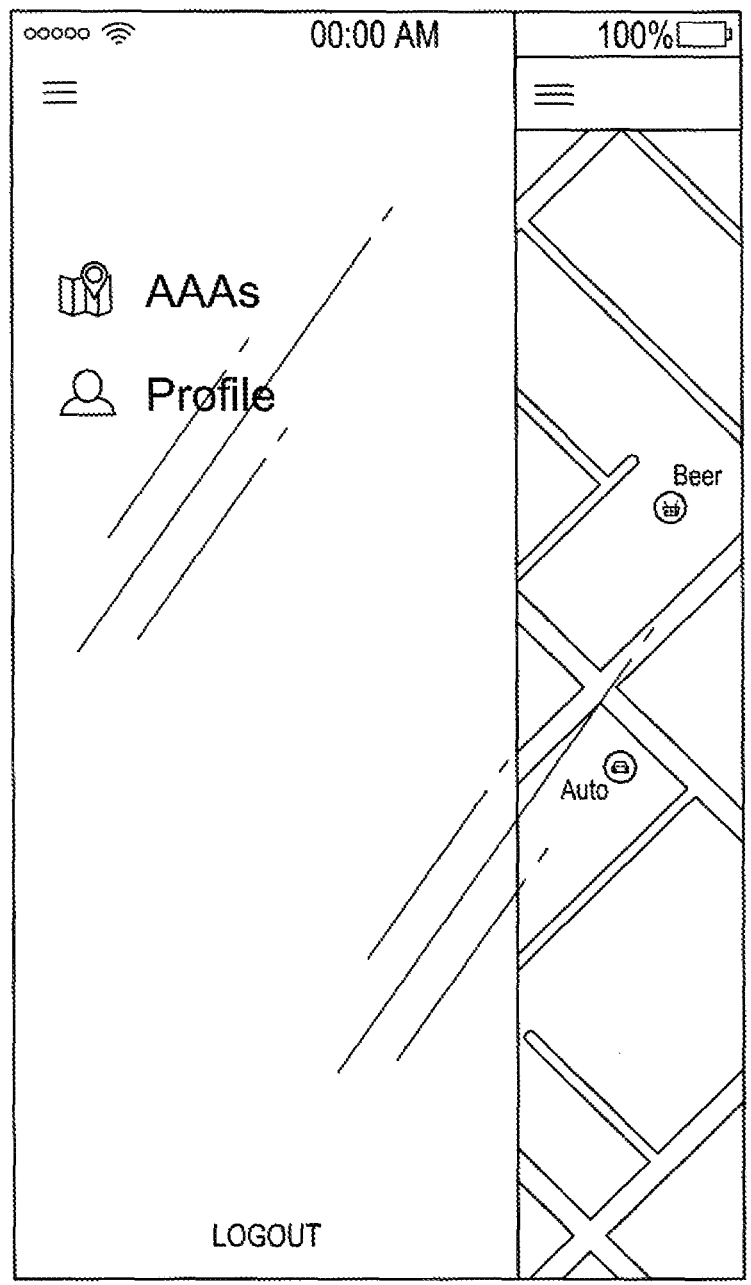
FIG. 10 is a screen shot of the user logging out of the secure network, in accordance with an embodiment of the present invention.

After completion of the user's access to file server 1050, the user logs out and the temporary AAA is canceled. Reference is made to FIG. 10, which is a screen shot of the user logging out of the secure network by use of a side-bar menu, in accordance with an embodiment of the present invention. Alternatively, the temporary AAA may expire after a designated time period.

There are many variations for division of processing labor between stationary device 100, administrator 160 and mobile device 200, all of which are contemplated by the present invention. Thus inter alia, referring to FIG. 2, operations 1060-1075, relating to validating the identity of the user via fingerprint or such other biometric, or via passcode or via another PIN-based mechanism, may be performed by stationary device 100 or alternatively by administrator 160, instead of mobile device 200. In such case, mobile device 200 transmits the scanned biometric/passcode to stationary device 100 or administrator 160 after performing operation 1055, and stationary device 100 or administrator 160 performs the validation, and the denial or grant of access.

Reference is made to FIG. 11, which is a screen shot showing an exemplary log report generated by access log recorder 170 for administrator 160, in accordance with an embodiment of the present invention. The log report lists authorized logins to file server 160 and unauthorized logins that were blocked, with dates and times, according to username.

Figure 12:
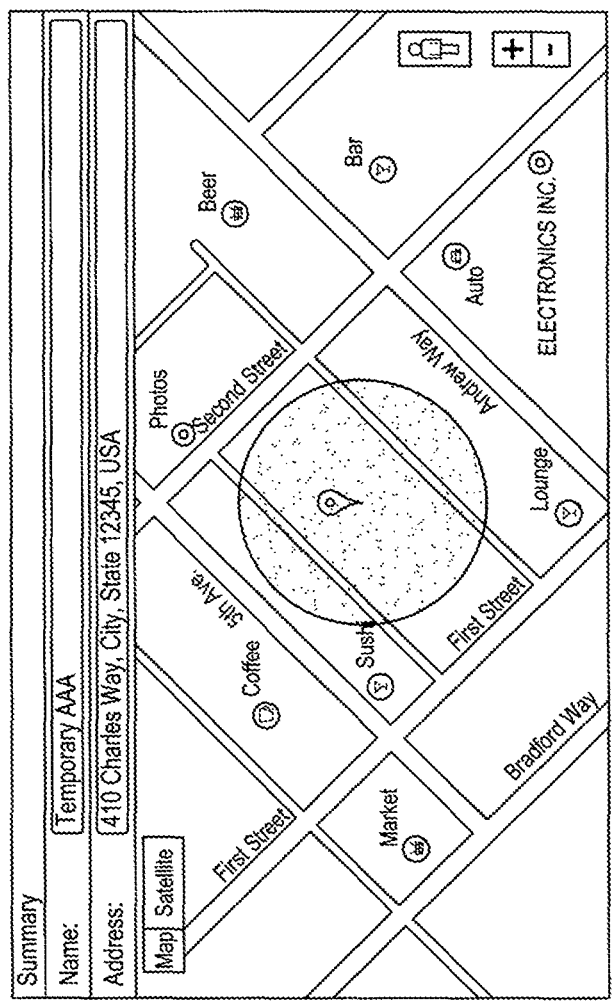
FIG. 12 is a screen shot of a temporary AAA being reported to an the administrator, in accordance with an embodiment of the present invention.

Reference is made to FIG. 12, which is a screen shot of a temporary AAA being reported to administrator 160, in accordance with an embodiment of the present invention.

Reference is made to FIG. 13, which is a screen shot showing an exemplary log report generated by access log recorder 170 for administrator 160, in accordance with an embodiment of the present invention. Valid user logins are indicated with a check mark, and invalid login attempts are indicated with a dash. The log report identifies locations, including latitude and longitude and addresses of users who logged into file server 150 and attempted to login to file server 150, according to dates and times.

It will thus be appreciated that embodiments of the present invention provide modules, systems and methods for data security whereby a remote device is granted access to a file server only when it is currently located in an authorized area of authentication.

Implementation Details

In an embodiment of the subject invention in accordance with the Django Python web framework, an AAA is modeled by the following class definition and table.

```
# AAA
class Location(CoreModel):
    name = models.CharField(max_length=125, blank=True, null=True)
    status = models.PositiveSmallIntegerField(choices=LOCATION_STATUS, default=LOCATION_STATUS.temporary)
    latitude = models.FloatField( )
    longitude = models.FloatField( )
    radius = models.FloatField(help_text="(meters)")
    address = models.CharField(max_length=500,blank=True, null=True)
    enabled = models.BooleanField(default=True)
    # required for temporary AAA
    user = models.ForeignKey(User, related_name="temporary locations", blank=True, null=True)
    temp_start_time = models.DateTimeField(blank=True, null=True)
    temp_end_time = models.DateTimeField(blank=True, null=True)
```

TABLE

"public.users_location"

| Column | Type | Modifiers |
|---|---|---|
| id | integer | not null default nextval('users_location_id_seq'::regclass) |
| created | timestamp with time zone | |
| name | character varying(125) | not null |
| latitude | double precision | not null |
| longitude | double precision | not null |
| radius | double precision | not null |
| address | character varying(500) | |
| status | smallint | not null |
| user_id | integer | |
| temp_end_time | timestamp with time zone | |
| temp_start_time | timestamp with time zone | |
| enabled | boolean | not null |

In an embodiment of the subject invention in accordance with the Django Python web framework, an access attempt is modeled by the following class definition and table.

```
class Access (CoreModel):
    user = models.CharField(max_length=125, blank=True, null-True)
    latitude = models.FloatField( )
    longitude = models.FloatField( )
    trust_level = models.PositiveSmallIntegerField(choices=TRUST_LEVELS)
    allowed = models.BooleanField(default=False)
    authorized_location = models.ForeignKey(Location, related_name="authorized_logins"), blank=True, null=True)
    unauthorized_location = models.CharField(max_length=500, blank=True, null=True)
```

TABLE

"public.users_access"

| Column | Type | Modifiers |
|---|---|---|
| id | integer | not null default nextval('users_access_id_seq'::regclass) |
| created | timestamp with time zone | |
| latitude | double precision | not null |
| longitude | double precision | not null |

TABLE-continued

"public.users_access"

| Column | Type | Modifiers |
| --- | --- | --- |
| trust_level | smallint | not null |
| allowed | boolean | not null |
| authorized_location_id | integer | |
| unauthorized location | character varying(500) | |
| user_id | integer | not null |

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. An electronic device comprising:
a memory storing at least one of biometric or passcode data of a user; and
a processor, (i) scanning biometric or passcode data of the user and validating the scanned biometric or passcode data with the biometric or passcode data of the user stored in said memory, (ii) dynamically identifying a current location of the electronic device, (iii) accessing a secure network, (iv) requesting access of data over the secure network, wherein access to the data is controlled by a server and the server enables access to the secure data only when the current location of the electronic device is within an authorized area of authentication (AAA), and if the current location of the mobile device is not within an existing AAA, the biometric or passcode data of the user is validated and (v) contingent upon the validation being affirmative, submitting a request to the server to generate a temporary AAA that includes the current location of the electronic device.

2. The electronic device of claim 1 wherein the temporary AAA expires after a specified time.

3. The electronic device of claim 1 wherein the temporary AAA expires after the mobile device logs out of the secure network.

4. The electronic device of claim 1 wherein said access requestor displays a map showing the temporary AAA and the current location of the mobile device.

5. A non-transitory computer readable medium storing instructions, which, when executed by a processor of an electronic device, cause the electronic device to:
identify a current location of the electronic computing device;
submit, to a server computer via a connection over a secure network, a request to access secure data, access to which is controlled by the server;
further submit to the server over the secure network, the current location;
when the current location is within an authorized area of authentication (AAA), receive, from the server, an enablement to access the secure data; and
when the current location is not within an AAA:
prompt a user who is currently using the electronic computing device to provide at least one of a biometric or a passcode;
scan the provided biometric or passcode from the user; and
validate the scanned biometric or passcode; and
contingent upon said validating being affirmative, submit to the server over the secure network, a request for a temporary AAA that includes the current location.

6. The computer readable medium of claim 5 wherein the temporary AAA expires after a specified time.

7. The computer readable medium of claim 5 wherein the temporary AAA expires after the mobile device logs out of the secure network.

8. The computer readable medium of claim 5 wherein the program code causes the computer to display a map showing the temporary AAA and the current location of the mobile device.

9. A mobile device for accessing secure data, comprising:
an access requestor submitting to a server computer both (i) an access request for secure data, and (ii) a current location of the mobile device,
wherein the server enables access to the secure data only when the current location of the mobile device is within an authorized area of authentication (AAA), and
wherein, when the current location of the mobile device is not within an existing AAA:
said access requestor prompts the user who is currently using the mobile device to enter a biometric or prompts the user to enter a passcode,
a biometric or passcode validator scans the biometric or passcode entered by the user, and validates the scanned biometric or passcode, and
contingent upon said validating being affirmative, said access requestor submits to the server a request that the server generate a temporary AAA that includes the current location of the mobile device.

10. The mobile device of claim 9 wherein the temporary AAA expires after a specified time.

11. The mobile device of claim 9 wherein the temporary AAA expires after the mobile device logs out of the secure network.

12. The mobile device of claim 9 wherein said access requestor displays a map showing the temporary AAA and the current location of the mobile device.

* * * * *